(12) United States Patent
Evans et al.

(10) Patent No.: US 8,064,116 B2
(45) Date of Patent: Nov. 22, 2011

(54) APPARATUS AND METHOD FOR PRODUCING A HOLOGRAM

(76) Inventors: Richard Howard Evans, Colchester (GB); David Roy Winterbottom, Colchester (GB); John David Wiltshire, Colchester (GB)

(*) Notice: Subject to any disclaimer, the term of this patent is extended or adjusted under 35 U.S.C. 154(b) by 691 days.

(21) Appl. No.: 12/093,942

(22) PCT Filed: Nov. 15, 2006

(86) PCT No.: PCT/GB2006/004258
§ 371 (c)(1),
(2), (4) Date: Jul. 7, 2008

(87) PCT Pub. No.: WO2007/057662
PCT Pub. Date: May 24, 2007

(65) Prior Publication Data
US 2008/0285100 A1 Nov. 20, 2008

(30) Foreign Application Priority Data
Nov. 15, 2005 (GB) .................................... 0523191.5

(51) Int. Cl.
*G03H 1/04* (2006.01)
(52) U.S. Cl. ........................................................ 359/35
(58) Field of Classification Search .................. None
See application file for complete search history.

(56) References Cited

U.S. PATENT DOCUMENTS

| | | | | |
|---|---|---|---|---|
| 5,896,359 A | * | 4/1999 | Stoll | 369/103 |
| 6,147,782 A | * | 11/2000 | Daiber et al. | 359/1 |
| 6,198,555 B1 | | 3/2001 | Kurokawa et al. | |
| 6,476,942 B1 | | 11/2002 | Kodama et al. | |
| 2002/0054402 A1 | * | 5/2002 | Klug et al. | 359/23 |
| 2006/0114532 A1 | * | 6/2006 | Brotherton-Ratcliffe et al. | 359/15 |
| 2006/0187510 A1 | * | 8/2006 | Kanaoka | 359/35 |

FOREIGN PATENT DOCUMENTS

GB 2159979 B 9/1987

* cited by examiner

*Primary Examiner* — Stephone B. Allen
*Assistant Examiner* — Derek S Chapel
(74) *Attorney, Agent, or Firm* — Schneck & Schneck (57) ABSTRACT

A holographic recording system (1) includes a transparent or semi-transparent holographic recording medium (6), a source of coherent optical radiation (7), and an optical system (10). The recording medium has a first side (25) presented toward the radiation source, a second side (26) opposite to the first side and presented toward the optical system, and a recording volume (30) between the two sides. The radiation source is arranged to project incident optical radiation (20) onto the first side and through the recording volume towards the optical system, which is arranged to redirect (32) the optical radiation back onto the second side and into the recording volume so that the incident and redirected radiation intersect within the recording volume at an obtuse angle (34) to create an interference pattern (38) from which a holographic recording may be made.

16 Claims, 3 Drawing Sheets

APPARATUS AND METHOD FOR PRODUCING A HOLOGRAM

BACKGROUND a. Field of the Invention

The present invention relates to a method and apparatus for producing a hologram, in particular a dot matrix reflection volume hologram.

b. Related Art

Holograms are used widely as security features. Credit cards normally have an embossed hologram laminated in the credit card structure, for example on the surface by a hot-foiling technique. An embossed hologram is in fact a thin transmission hologram with reflective metallization. On the other hand, transmission holograms recorded in silver halide film are often referred to as "thick" or "volume" transmission holograms. Embossed holograms are relatively inexpensive to mass produce, and provide a bright, visible three-dimensional image when viewed by eye under good lighting conditions at the correct viewing angle. A limitation of such holograms is that diffraction effects cause the colouration of the holographic image to vary sharply with viewing angle, which is undesirable for some images, for which fixed or nearly fixed colours would be more appropriate, for example the image of a user's face or the image of a trademark, for which colour is an important feature.

In recent years, it has also become easier for criminals to make convincing copies of embossed holograms, partly because the hologram is encoded in a surface relief pattern on a reflective substrate from which it is possible to make a copy by illuminating the hologram with a laser, so as to transfer the image into a holographic recording material, which could later be used to produce multiple unauthorized copies.

In some cases, it is also possible to mimic the visible colouration effects of an embossed hologram by using suitable inks which present different colours across a range of viewing angles. Under casual inspection, a forged security device using colour variable inks may pass for a genuine embossed hologram security device.

In a further counterfeiting technique, simple diffractive hot foils may be used in multiple passes of a hot foiling system to simulate the multi-angle diffractive effects of a complex hologram.

It is an object of the present invention to address these issues.

SUMMARY OF THE INVENTION

According to the invention, there is provided a method of forming a volume reflection hologram in a holographic recording medium, the medium being transparent or partially transparent and having a first side and opposite to the first side a second side, the method comprising the steps of:

i) providing a coherent source of optical radiation;
ii) directing the optical radiation towards the recording medium so that said radiation is incident on said first side, at least some of said incident radiation being transmitted through the recording medium to exit from said second side along an optical axis;
iii) redirecting at least some of said exit radiation back towards said recording medium so that said redirected radiation is incident on said second side, at least some of said redirected incident radiation being transmitted through the recording medium towards said first side, said incident radiation and said redirected incident radiation thereby intersecting at an obtuse angle to create at least one interference pattern within the optical recording medium;
iv) creating from one or more of said interference patterns a volume hologram in the recording medium;

wherein step iii) comprises the steps of:

v) first directing the exit optical radiation away from the optical axis; and then
vi) directing the exit optical radiation back towards the optical axis and said second side so that said redirected optical radiation is incident on the second side at an obtuse angle to the optical axis.

Also according to the invention there is provided an apparatus for recording a volume reflection hologram in a transparent or partially transparent holographic recording medium, comprising a coherent source of optical radiation, a mount for holding the recording medium, and an optical system, wherein:

the mount defines a recording plane positioned between the source of optical radiation and the optical system;
the mount is arranged to hold the recording medium in the recording plane so that in use a first side of the recording medium is presented towards the source of optical radiation, and so that a second side of the recording medium opposite to the first side is presented towards the optical system;
the source is arranged to project the optical radiation towards the recording plane and towards the optical system along an optical axis;
the optical system is arranged to redirect said optical radiation away from the optical axis and then back towards the recording plane, said optical radiation projected from the source and said redirected optical radiation thereby intersecting at an obtuse angle in the recording plane, so that in use at least one interference pattern is created within an optical recording medium positioned in the recording plane.

The invention further provides a holographic recording system, comprising a coherent source of optical radiation, a transparent or partially transparent holographic recording medium and an optical system, wherein:

the recording medium has a first side, a second side and a recording volume, the second side being opposite to said first side and the recording volume being between said sides;
the recording medium is positioned between the source of optical radiation and the optical system so that said first side is presented towards the source of optical radiation and said second side is presented towards the optical system;
the source is arranged to project incident optical radiation onto said first side and through the recording volume and towards the optical system along an optical axis;
the optical system is arranged to redirect said optical radiation back onto said second side and into the recording volume so that said incident and redirected optical radiation intersect within the recording volume at an obtuse angle to create an interference pattern from which a holographic recording may be made; and
the optical system is arranged first to direct the optical radiation away from the optical axis and then to direct said optical radiation back towards the optical axis and towards the incident projected optical radiation within said recording volume at said obtuse angle.

The coherent source of optical radiation may include one or more coherent wavelengths. The use of three primary colour wavelengths can provide a visually white reflective holographic image.

The exit radiation may be gathered and redirected by means of an optical arrangement comprising two or more mirrors, or an optical fibre or fibre bundle, or any other arrangement of mirrors or optical devices so that the exit radiation is redirected initially away from an optical axis defined by the path of the exit radiation, and then back towards the second side of the recording medium.

The recording medium may be supported on a transparent substrate, typically a glass plate of about 1.8 mm thickness on which the recording medium is coated. A typical recording medium is a gelatine-based photosensitive silver halide coating of a thickness between 8 µm to 20 µm. Preferably, to aid mass production after recording of a master volume hologram, the master is recorded with the emulsion being on the second surface with respect to the laser source. Contact copying of volume reflection holograms is then possible, with the photosensitive layers of the master and copy being in optical contact.

Furthermore, it is advantageous if the incident laser beam is normal to the recording plate as then the emerging beam will also be perpendicular to the plate. The optical system does not need to take into account refraction within the glass in re-directing the spot of optical radiation precisely upon its source point.

Preferably the optical radiation is linearly polarised, and most preferably the returning and incident beams are of the same polarisation. The recording material substrate may be glass or film. It is preferred not to use birefringent materials such as PET film, as this can cause severe problems of mismatch of polarisation plane, especially when the recording emulsion is on the laser-incident side.

Preferably means are provided to control the relative orientations of the polarisations of the incident optical radiation and the redirected optical radiation within the recording volume.

The term "hologram" as used herein includes holograms formed from continuous gratings in which the image is encoded across the entire recording as well as holograms formed from individual, adjoining or spaced apart holograms that together form a holographic image.

The holographic recording medium may be a photographic recording medium—for example by photographically developing an exposed interference fringe pattern formed in a transparent or partially transparent photographic recording medium. Generally silver halide recording materials will be developed and bleached in order to create a phase recording rather than an amplitude recording. Thus, the fringe structure takes the form of refractive index modulation.

An advantage of volume reflection holography is that eye-visible colours vary much less depending on viewing angle than is the case with an embossed hologram. This makes a volume hologram more suitable for the production of a holographic image for which accuracy of the perceived colour is an important feature. The invention makes advantage of a transparent or partially transparent recording medium by providing the return beam on the side of the recording medium opposite to the incident side.

Another advantage of the invention is that it is possible in chemical and/or thermal processing of the transparent or semi-transparent recording medium to change composition and/or structure of the recording medium, and hence change the refractive index and/or dimensions of the medium in order to shift the wavelength generated by the fringe pattern to wavelengths not matching those of readily available fixed wavelength lasers, for example those of a red HeNe laser, a green frequency doubled Nd:YAG laser or a blue HeCd laser. This makes it more difficult for others to make a direct copy the holographic image by optical contact copying. When holograms are used for security purposes, the counterfeiter may attempt to illuminate the hologram with lasers to reconstruct the image and thus copy the hologram, by holographic contact copying, where a new recording material is placed in contact or close to the original layer. If the final component wavelengths of the device are selected to avoid close proximity to the commonly available laser lines it is possible to make it more difficult for the unauthorised copier to reconstruct the image. Whereas embossed holograms can be illuminated from a slightly reduced or increased angle of incidence to effectively adjust their colour to be compatible with that of the copying laser, the same is not true for reflection volume holograms, whose colour does not change appreciably when they are tilted with reference to the illuminating source.

An optical axis may be defined by the direction optical radiation projected from the recording volume travels towards the optical system. The creation of the interference pattern within the optical recording medium then involves first directing the exit optical radiation away from the optical axis, and then directing the exit optical radiation back towards the optical axis and the second side so that the redirected optical radiation is incident on the second side at an obtuse angle to the optical axis.

The interference pattern will, in general, comprise spaced-apart interference fringes. It is then possible to vary the angle of incidence of the incident optical radiation on the first side and/or vary the angle of incidence of the redirected optical radiation on the second side in order to vary the obtuse angle and hence the angle of the interference fringes.

In a preferred embodiment of the invention, the direction of incidence of the redirected optical radiation on the second side is varied in order to vary the orientation of the interference fringes. This permits control of the angles within which a holographic image will be visible to the eye.

Preferably, therefore, the optical system has one or more rotatable optical elements for varying the direction of incidence of the redirected optical radiation on the second side in order to vary the orientation of the interference fringes. In a preferred embodiment of the invention, the optical system is rotatable about an optical axis defined by the direction of the exit optical radiation towards the optical system.

Preferably, a plurality of interference patterns having different interference fringe spacings and/or orientations are formed in corresponding different volumes of the recording medium in order to produce an eye-visible or machine-visible holographic image. For example, the apparatus may include a mount for holding the recording medium and an X-Y stepping system for moving the medium with respect to two orthogonal directions transverse to an optical axis extending generally between the optical source and the optical system. This permits the recording of a dot matrix volume reflection hologram.

Preferably, the holographic recording system is used to record a plurality of discrete volume holograms, each with an interference pattern having a selected fringe spacing and/or fringe orientation to form an eye-visible holographic image that may used as a security device.

The holographic recording system may therefore comprise means to reposition the recording medium relative to the optical source and the optical system. A plurality of interference patterns having different interference fringe spacings and/or orientations may then be formed in corresponding different volumes of the recording medium in order to produce an eye-visible holographic image.

The use of computer graphics enables the individual pixels of the array to be encoded in their fringe orientation so that certain groups of pixels will direct light towards the eye of the viewer when illuminated from certain angles such that graphic images will be seen with appropriate colouring from one position of view, whilst a small change in viewing position, or the equivalent tilting of the holographic recording film, reveals a separate image with its own colour effects. Thus animation of an image is an obvious possibility with this system.

Whereas transmission embossed holograms with metallic or high refractive index reflective coating will reconstruct an orthoscopic or pseudoscopic image of similar appearance, by light arriving at the appropriate angle of incidence from either above or below the normal to the surface, volume reflection holograms are selective in the direction of that illumination. Thus, it is possible to create graphic image reconstructions which differ absolutely when the hologram is illuminated from the top or the bottom. Thus it is feasible to create a hologram which could be applied to a product or document which will show either a similar or a differing image whether the applied film or the substrate is upright or inverted. Such a quality is highly advantageous, especially in view of the criticism directed at the inability of embossed holography to display differing discrete images in the inverted position, which deficiency has been explored and partially improved by expensive e-beam lithographic methods.

Since specific directional reflection of incident light is a feature of this system, it is entirely feasible that light is directed into specific channels such that the binocular vision of the viewer is stimulated so as to enable stereoscopic effects to be experienced and thus enable the representation of three dimensional images in full colour.

In order to improve the quality of graphic displays especially with respect to the improvement of the quality of lines directed non perpendicular to the matrix, the use of vector graphics is well known in graphic design. The present system lends itself to this technique since the drivers of the positioning system may be used to position the recording medium in a similar way to the image pixel positioning used in vector graphics techniques such as those used by the leading graphics packages such as Adobe "Illustrator" (Reg.™). Such graphics packages have considerable advantage over conventional raster graphics "bit-map" systems, especially when detailed microscopic text fonts, for example, are required in security design work.

BRIEF DESCRIPTION OF THE DRAWINGS

The invention will now be further described, by way of example only, and with reference to the accompanying drawings, in which.

DETAILED DESCRIPTION

Figure 1:
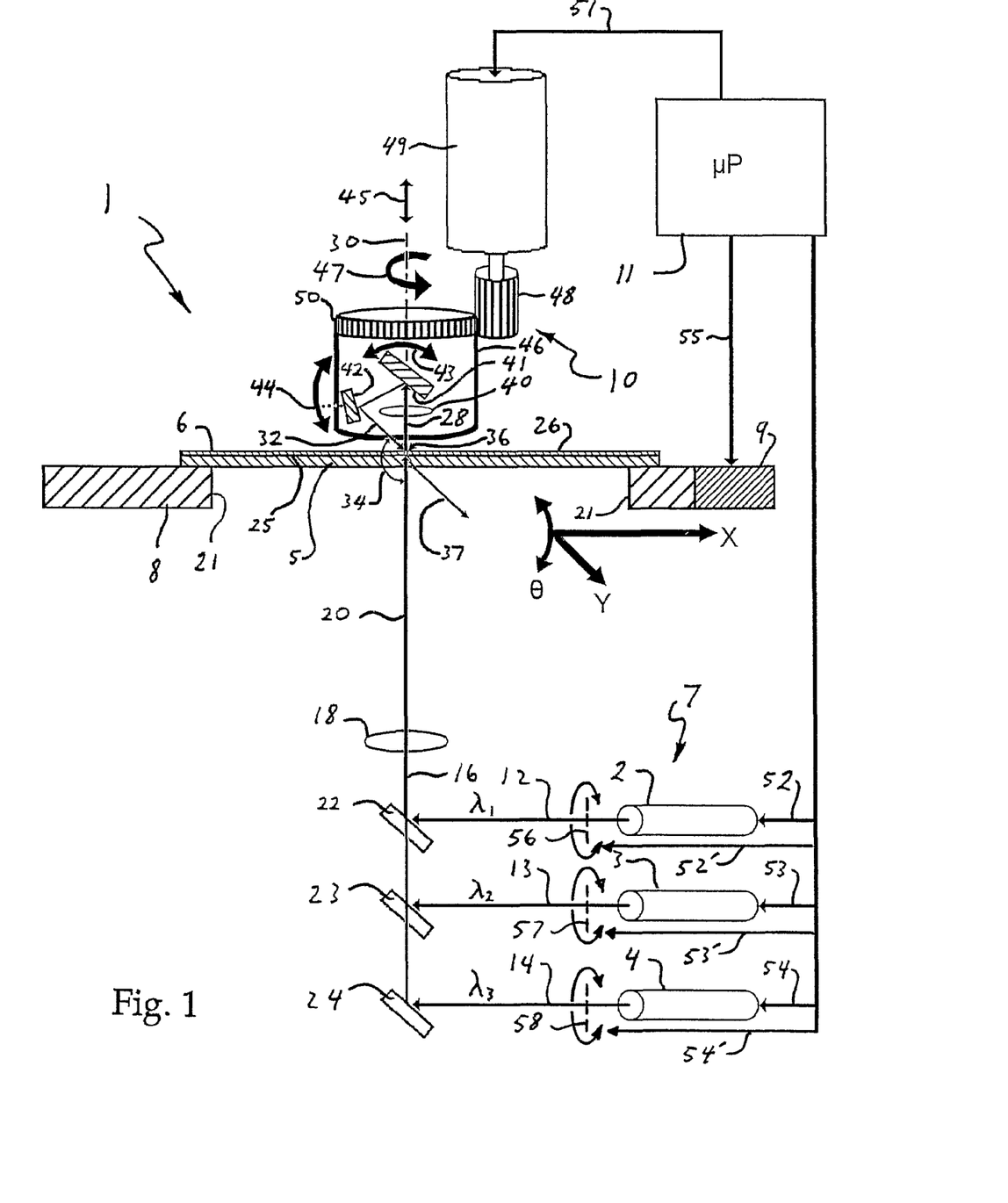
FIG. 1 is a schematic diagram showing a holographic recording system according to a first preferred embodiment of the invention, having three coherent sources of optical radiation, a mount holding a nearly transparent holographic recording medium, and an optical system arranged to return optical radiation into a recording volume of the medium.

FIG. 1 shows a holographic recording system 1 with a source of optical radiation 7 having three lasers 2, 3, 4, a nearly transparent holographic recording medium 6 coated onto a glass slide or carrier 5 which is held on a mount 8 that has an X-Y translation stage 9, an optical system 10 and a microcontroller 11 arranged to control the operation of the lasers, 2, 3, 4, the mount 8 and the optical system 10.

The lasers are selected to provide three primary colours, a HeNe laser 2 having a red output 12 with a wavelength $\lambda_1$ at 633 nm, a frequency doubled Nd:YAG laser 3 having a green output 13 with a wavelength $\lambda_2$ at 532 nm and a HeCd laser 4 having a blue output 14 with a wavelength $\lambda_3$ at 442 nm. The outputs 12, 13, 14 from each of these is combined into a single beam 16 using corresponding beam-splitter mirrors 22, 23, 24, and controlled and focussed by a lens or lenses 18 which project a projected beam 20 towards the mount 8 and recording medium 6.

The glass slide 5 rests on the mount 8 nearest the optical system 10, with the coated recording medium 6 being on the side of the glass slide 5 towards the optical system 10. The mount 8 has an aperture 21 through which the projected beam 20 passes on its way towards a first side 25 of the recording medium 6. In this example, the first side 25 of the recording medium is an interface between the recording medium 6 and the glass slide 5. Although the angle of incidence here is illustrated as being 90°, the angle of incidence may be chosen to be less than this, but greater than a critical angle at which the incident projected optical radiation 20 does not enter the glass slide 5 or recording medium 6.

Most of the optical radiation 20 incident on the first side 25 of the recording medium 6 enters a recording volume 36 of the recording medium 6 and travels towards a second side 26 of the medium opposite the first side 25 from which most of the transmitted optical radiation exits the medium as an exit beam 28. The direction of the exit beam 28 defines an optical axis 30.

The holographic recording emulsions used in the preferred embodiment of the invention contain silver halide crystals which are exceptionally small. A suitable recording medium is available from Colour Holographic Limited of Witham, Essex, UK, having grains of a diameter less than 20 nm. Recording materials for holography made in the past by major photographic suppliers such as Agfa Gevaert (Reg.™) and Kodak (Reg.™) contained far larger grains that were deleterious to the transmission of light through the layer without absorption and scatter. Because of this very small grain size, the emulsions from which the recording layer is formed are almost entirely transparent, even in liquid form in the vessel before coating. The use of extremely small grains is important to minimise or avoid Raleigh scatter especially when blue lasers are being used. High clarity of the recording layer is an important consideration because absorbance or scatter of the incident beam will result in an unsatisfactory beam ratio in the standing wave formed with the return beam, and will therefore produce less efficient gratings. In other words, the returned beam would be inferior to the incident beam. In practice, it has been found that a 1:1 ratio for the transmitted and return beams produces a bright recorded holographic image. Optical losses during transmission can be compensated for in the recording volume by focussing the return beam more tightly than the transmitted beam.

Dichromated gelatine, photopolymer and photorefractive crystals are other materials suitable for recording reflection volume holograms according to the invention. Such grainless materials may also be used to provide a bright recorded holographic image.

The glass plate 5 is typically 1.5 mm to 3 mm thick. The coated emulsion 6 preferably extends 8 μm to 10 μm between the first and second sides 25, 26.

For a film coating 6 the carrier 5 could be a triacetate or polyester such as PET of a thickness between 50 μm to 200 μm. For security purposes the thinner layers are more suitable so as not to restrict the total thickness of the product or device.

There may be some advantage in using a thicker emulsion coating, for example 20 μm, especially when coating onto a glass plate for use as a master hologram recording. This will enable the creation of higher diffraction efficiency. This may be linked with highly selective reflection of a very narrow band of wavelengths.

Whereas the silver halide film manufacturers have found it convenient to restrict the coating thickness of gelatin emulsion, it is feasible that thicker coatings on glass for the specific purpose of master manufacture will lead to the ability to create pixel elements with diffraction efficiency close to 100% reflectivity. Such diffraction efficiency of a master hologram will have compound advantageous effects on the resulting brightness of mass produced copy holograms.

The optical system 10 is used to form a redirected return beam 32 that is incident on the second side 26 of the recording medium 6 in the vicinity of the exit beam 28. Most of the return beam 32 is transmitted into the recording medium 6 and intersects the initially incident beam 20 at an obtuse angle 34 within the recording volume 36 between the first and second sides 25, 26 of the recording medium 6. Some of the return beam proceeds to exit the recording medium 6 through the first side 25 as a final exit beam 37. Because of the perpendicular orientation of the projected beam 20 to the parallel first and second sides 25, 25 of the recording medium 6, the projected beam 20 is collinear with the portion of the projected beam transmitted into the volume 36 of the recording medium 6 and also the exit beam 28.

The intersecting beams 20, 32 form essentially plane-parallel interference fringes 38 (see FIGS. 3 and 4) within the recording volume 36. The spacing of the volume fringes 38 depends mainly on the wavelength(s) of the coherent intersecting beams of optical radiation 20, 32, as well as the refractive index of the recording medium 6. The angle of the fringes 38 depends mainly on the intersection angle 34, as well as the refractive index of the recording medium 6.

Figure 2:
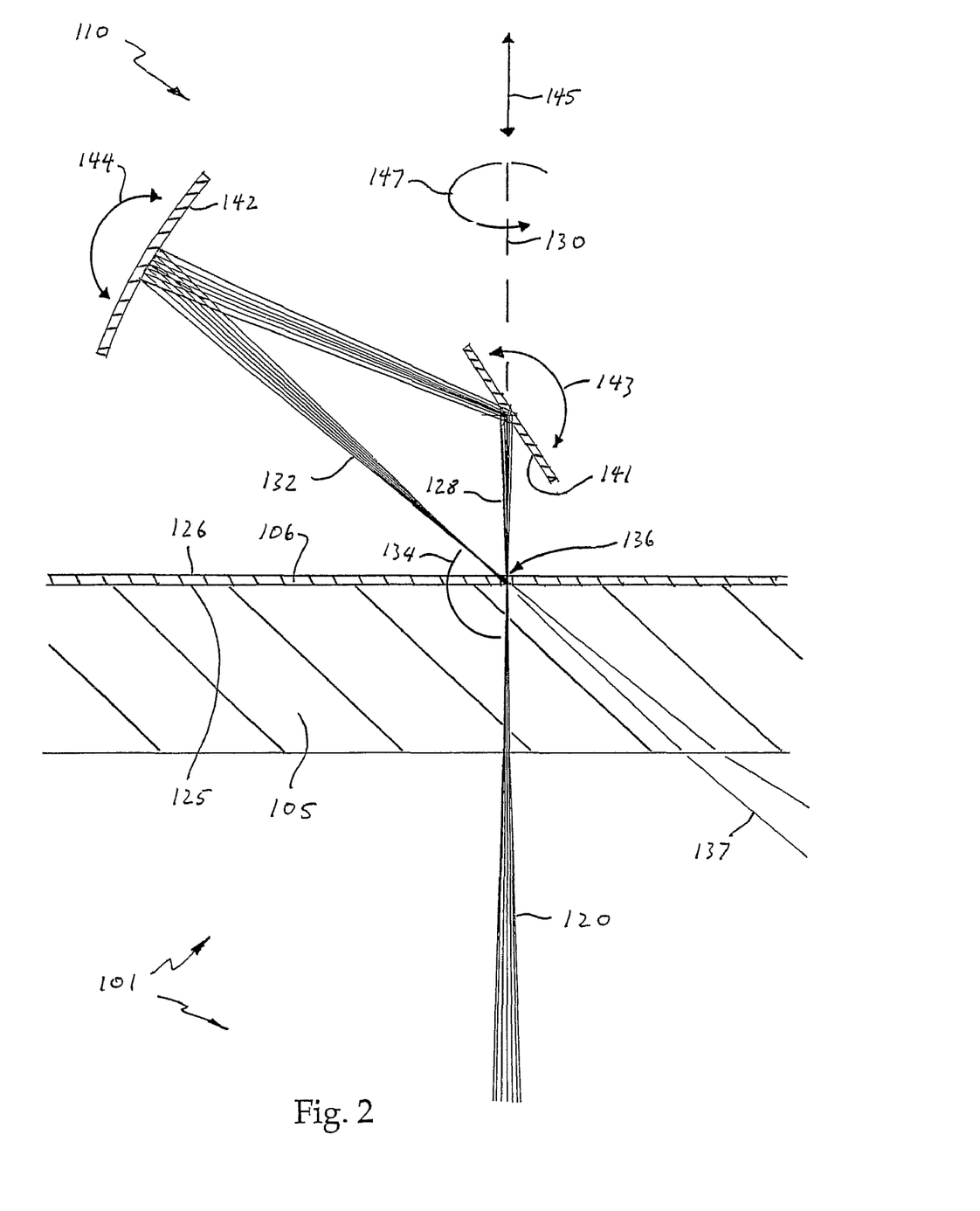
FIG. 2 shows an alternative arrangement for the optical system of FIG. 1 for use in a second preferred embodiment of the invention.

In one embodiment of the invention, the optical system 10 for producing the return beam 32 includes a focussing system 40 having, for example, one or more collimating lenses which focus the exit beam 28 towards a first mirrored surface 41 and a second mirrored surface 42. Alternatively, the collimating lens(es) 40 may be omitted and one or more mirrors 41, 42 may be curved to focus the beam. An example of such an alternative arrangement 101 is shown in FIG. 2, in which features corresponding with those in FIG. 1 are indicated by reference numerals incremented by 100. Here an exit beam 128 is directly incident on a first plane mirrored surface 141 which directs the beam onto a spherically concave mirrored surface 142.

In the first embodiment 1, the focussing system 40 gathers and re-collimates the exit beam 28 and so controls the size or diameter of the return beam 32 incident on the second side 26 of the recording medium 6. The first mirrored surface 41 receives the focussed exit beam 28 from the focussing system 40 and is set non-perpendicular to the optical axis 30 to direct this beam laterally away from the optical axis 30, and preferably also in a direction back towards the recording medium 6. The second mirrored surface 42 receives the exit beam from the first mirrored surface 41 and directs this back towards the optical axis 30 and the second side 26 of the recording medium 6 so as to intersect within the recording volume 36 the projected beam 20 from the optical source 7.

In the alternative embodiment 101 illustrated in FIG. 2, there is no separate focussing system 40, as focussing of the return beam 132 is provided by the concave second mirrored surface 142, which directs this beam back towards the optical axis 130 and the second side 126 of the recording medium 106 so as to intersect within the recording volume 136 the projected beam 120. All the other components and features of the alternative embodiment, such as the optical source 7, optical system 110, controller 11, mount 8 and translation stage 9 are all the same as in the first embodiment, and so for clarity are not illustrated in FIG. 2.

The orientation of the first and second mirrored surfaces 41, 42, 141, 142 and also the axial position of the optical system 10, 110 may be manually or automatically set, as indicated by arrows 43, 44, 45, 143, 144, 145 in order to fix the obtuse angle 34, 134 of intersection and maintain the intersection of the transmitted and return beams 20, 32, 120, 132. In both embodiments 1, 101, this setting is an automatic setting controlled in a similar manner to that explained below for setting the rotational orientation of the optical system 10, 110.

The optical elements 40, 41, 42, 140, 141, 142 of the optical system 10, 110 are housed within a housing 46, which is preferably cylindrical and rotatable 47, 147 on bearings (not shown) about the optical axis 30, 130 in a fixed axial relationship with respect to the recording medium 6, 106. The optical system 10, 110 includes an electric stepper motor 49 which turns a drive gear 48, which is engaged with a ring gear 50 that extends externally around the housing 46. Other types of drive such as a belt may alternatively be used. The stepper motor 49 can therefore be energised to turn and set the rotational orientation of the optical elements 40, 41, 42, 140, 141, 142 in order to vary the plane in which the return beam 32, 132 and projected beam 20, 120 intersect. This gives rapid and precise control over the angular orientation of the recorded grating 38 over a full 360° about the optical axis 30, 130.

It is preferred to maintain the same orientation between the polarisations of the incident beam 20, 120 and return beam 32, 132. This may be done by providing three rotatable half-wave plates 56, 57, 58, one for each of the three laser sources 2, 3, 4 before these are combined by the beam-splitter mirrors 22, 23, 24.

The microcontroller 11 has a number of output lines 51, 52, 52', 53, 53', 54, 54', 55 which are connected to the stepper motor 49, the lasers 2, 3, 4, the lasers' rotatable half-wave plates 56, 57, 58, and the X-Y translation stage 9 of the mount 8. Here the X-Y axes are at right angles to the optical axis 30, 130.

The holographic recording system 1, 101 may optionally comprise an angular adjustment for varying the angle of incidence of the incident optical radiation 20, 120 on the first side 25, 125 in order to vary the obtuse angle 34, 134 and hence the angle of the interference fringes 38. This could be accomplished by adding a tilt adjustment Θ to the X-Y translation stage 9.

Although not illustrated, the microcontroller 11 may be connected to a personal computer with user inputs and displays to aid control of the holographic recording system 1, 101.

In use, the microcontroller is used to control the intensities of the coherent optical outputs 12, 13 14 from the lasers 2, 3, 4. The optical outputs 12, 13, 14 may be individually switched on and off, for example by shuttering a continuous wave output, so that only one wavelength $\lambda_1$, $\lambda_2$ or $\lambda_3$ is present at any given time, or the wavelengths may be mixed. In the former case, just one grating 38 will be formed; in the latter case there will be a superposition of gratings 38. Different wavelengths $\lambda_1$, $\lambda_2$ or $\lambda_3$ may optionally be spatially separated so that multiple distinct gratings are formed, preferentially simultaneously.

The recording medium 6 is stationary during recording of a grating 38, after which the laser outputs 12, 13, 14 are switched off while the X-Y and optionally Θ translation stage 9 is used to move the recording medium 6, 106 to position a new recording volume 36, 136 on the optical axis 30, 130. The cylindrical housing 46 may then be rotated 47 by an angle to select a desired grating rotational orientation about the optical axis 30, while at the same time rotating each of the three half-wave plates 56, 57, 58 by the same angle to maintain the same orientation of the polarisations of the incident beam 20, 120 and return beam 32, 132 within the recording medium 6, 106.

As an alternative to providing rotating half-wave plates, 52, 53, 54, it would be possible to rotate the entire plate 5, 105 and recording medium 106, 106 about the optical axis, again by the same angle, but this may introduce difficulties in ensuring that a further rotational stage (not shown) was centered on the optical axis 30, 130.

Figure 3:
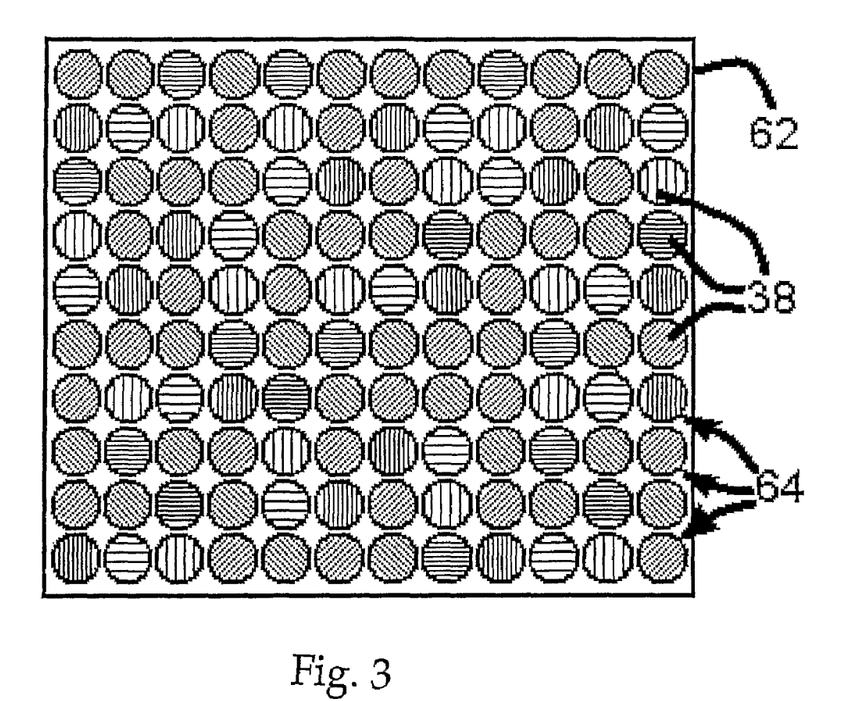
FIG. 3 is a schematic diagram showing how the system of FIG. 1 may be used to record a dot matrix volume hologram having discrete volumes into which gratings having different pitches and orientations have been formed.

One or more of the lasers 2, 3, 4 is then switched on to record a new grating 38. In this manner, as shown in FIG. 3, an area of recorded spots 64 may be recorded to form an eye-visible recorded hologram 62. In a security hologram visible to the eye, the typical dimensions of a recorded spot 64 may be between 25 μm and 250 μm. The recording may be performed on a square grid array as shown in FIG. 3, or in a close-packed hexagonal arrangement using a stepper motor-driven X-Y translation stage, while the latter may offer a higher overall diffraction efficiency and hence higher visibility owning to less wasted space between recorded spots or pixels 64. The area of the hologram 62 may be between about 5 mm and 50 mm along either edge, but smaller or larger holograms may be recorded depending on the use and the image(s) which the hologram is to present.

There are applications of embossed holography such as replacement of the metal strip in banknotes where hologram strips as narrow as 2 mm are used. Conversely, large image holograms could be made using the process according to the invention. However the number of pixels in total is a square function of the dimensions of the image and so it may take an unrealistic period of time to expose all of the pixels necessary to produce a large hologram. In that case the pixel size could be increased and the laser power could be increased in order to reduce the exposure time and the necessary settling period after the motion of the recording plate is stopped before the laser shutter is opened. Such a settling period is necessary to ensure that motion does not prevent the recording of a stable interference pattern which is able to produce a diffraction efficient grating. There is a finite limit to the ability of electronic shutters to allow a consistent exposure period in the lower range of milliseconds and opto-acoustic shutters are better able to accommodate extremely short exposures.

Figure 4:
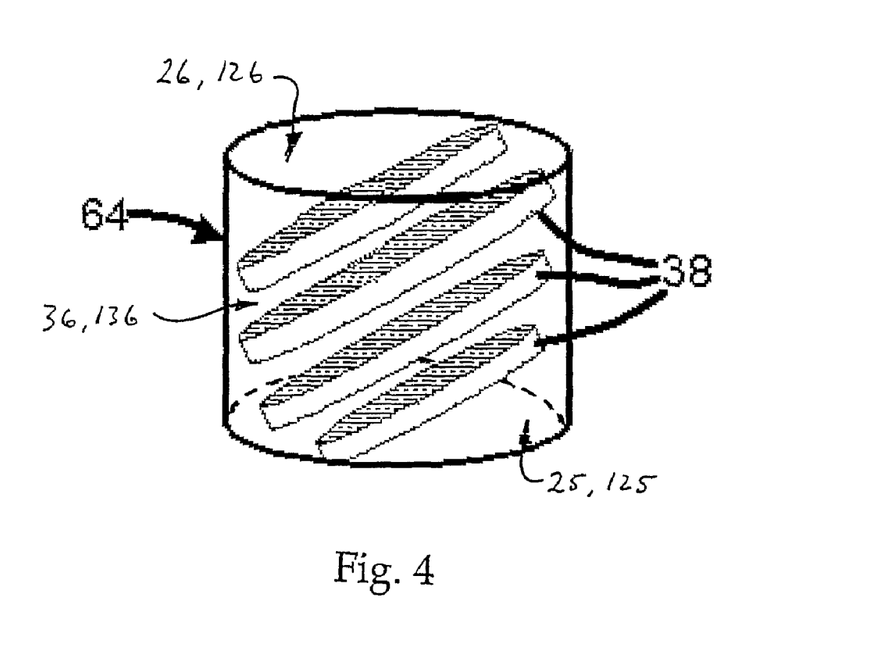
FIG. 4 is a schematic diagram of a volume of the recording material in which a plurality of adjacent planar diffraction gratings have been formed from which a reflection volume holographic image may be formed.

It should be understood that FIG. 3 is schematic only, and that the optical fringe pattern 38 forming the recorded grating will extend through the volume of the recording material in three-dimensions, essentially along spaced apart planes that are non-parallel with the first and second sides 25, 26, 125, 126 of the recording medium 6, 106, as illustrated in FIG. 4.

The first hologram made with the described device may undergo chemical or physical processing designed to ensure the wavelength of the image produced preserves the original colour of the incident lasers. In this way a 'master hologram' or series of master holograms may be produced which is suitable for contact copying into film for the purpose of mass production of the device. In this case the film may be laid in contact with the master or group of masters and illuminated normally with lasers of the same wavelength as the originating laser. Precise control of this reconstruction wavelength is required to ensure efficient contact copying to produce bright mass-produced holograms.

However, the requirement for the processing of the mass produced film holograms is quite different. Here, the wavelength of reconstruction is quite deliberately adjusted to a new wavelength which does not coincide with commonly available laser lines, so the unauthorised copying of the security device becomes very difficult.

The recorded hologram 62 may be altered using chemical pre-treatment of the recording medium 6, 106 in order to alter the visible colours produced by the hologram. Thus the final colours are not limited to those of the original laser sources 2, 3, 4, but may, within bounds, be altered after the original recording to achieve multiple colour effects with the use of a single laser wavelength. This also provides a security benefit as it is then not possible to make a copy using the fixed wavelength of similar lasers. High diffraction efficiency in the shorter wavelengths in the visible spectrum is achievable by this technique.

In this method, the recording medium 6, 106, which may be typically a red sensitive silver halide plate BB640, as supplied by Colour Holographic Limited, Witham, Essex, UK, rather than a panchromatic recording plate, is exposed to red laser light 12 in the same way as previously described, but without the use of second and third laser frequencies.

In this variation, the single red laser wavelength $\lambda_1$ is first used to expose all of the information pixels 64 required to be red when viewed by the user of the master hologram recording, with the same method of controlling the angular orientation as previously described.

After completion of the recording of the 'red' data pixels 64 the recording plate 5, 105 is removed from the mount 8 and treated in a chemical bath typically containing a 6% solution of Triethanolamine (TEA) for two minutes before carefully drying the plate 5, 105 in a stream of warm air. This treatment will cause the thickness of the gelatine-based recording layer 6, 106 to expand. The plate 5, 105 is then replaced in the mount 8 and registered in position with respect to the previously recorded 'red' spots. Those pixels 64 which are designated 'green' are then exposed into the layer again with the red laser 2.

The plate 5, 105 is then removed once more a treated in a solution of, say, 10% TEA and again dried causing the thickness of the recording layer 6 to further increase after which the plate 5, 105 is returned in registered position to the mount 8. The pixels 64 designated 'blue' are now exposed again using the red laser 2.

A subsidiary effect of TEA treatment is that the photographic speed is increased, since the nitrogen containing molecule tends to have the effect of enhancing photosensitivity of the silver halide crystals. This is sometimes referred to as "pre-sensitisation". Thus lower laser exposure is usually necessary to achieve the required silver density after development. Thus it is sometimes advantageous to reverse the order of shooting such that the "blue" exposure is made first, and TEA is sequentially washed out of the layer by washing in water prior to pre-swelling for "green" in a more dilute solution of TEA and finally washed out of the layer in water to achieve the "red" pixels, such that the layer retains a slight presensitisation effect despite the absence of effective pre-swelling.

After completion of all of the one, two, three or more exposure sequences the hologram 62 is subjected to the ordinary processing regimes typically used for reflection holography. When the recording layer is returned to its ordinary thickness subsequent to the processing step, the pixels 64 exposed under the influence of the TEA treatments will assume the required green and blue reflective qualities and the red pixels will retain their natural colour dictated by the exposure laser 2.

Higher concentrations of Triethanolamine solution used for pre-treatment may be used to achieve fringe manipulation such that reflective replay beyond the visible spectrum is achieved thus encoding the hologram with covert information in the ultra-violet part of the spectrum, which will not be detected by the human eye but which may be visible to an electronic camera.

It follows also that other wavelengths intermediate within the visible spectrum may be obtained in the hologram matrix by treating the layer with other concentrations of swelling agent. Useful and novel optical variable devices specifically for use in the security industry can therefore be formed according to the invention. The variation of the colour palette from time to time may be an invaluable aid to the prevention of counterfeiting. Examples of counterfeiting of embossed holography tend to indicate that counterfeiting facilities are set up in laboratories in certain parts of the world ready to copy newly released holograms. Changing the colours of these volume holograms over a period of time will cause unauthorised copiers to need to acquire different lasers and make changes to the configuration of their equipment.

When making holograms in photopolymer materials, such as those formerly supplied by E.I. Du Pont de Nemours, for holographic recording, similar pre-processing techniques may be utilised. In this case, special films containing solvent material appropriate to the construction of the polymer may be laminated to the surface of the recording film in order to influence the replay colour of the hologram, by ingress into the recording layer itself. Such a method can therefore be used to adapt the pre-processing method described above for photopolymer materials.

It should be noted that there is a special advantage in the use of uncommon or unusual laser wavelengths 12, 13, 14 which are not routinely available in the typical physics laboratory. Whereas the physical thickness of the recording material may be easily adjusted in such a way as to adjust the wavelengths of the mass produced hologram, the whole range of colour components will thus shift simultaneously by an identical percentage of their original value at exposure. However, whereas perhaps one of these adjusted colours may well fall in the area of a nearby laser line, the other components may well fall outside the available range of common laser colours, thus making a difficult target for the unauthorised copier. Similarly, if the recording is made using an unusual laser colour and thus unusual intervals between them, then the whole process of back-engineering the process of the invention is made extremely inconvenient to the detriment of the prospective counterfeiter, whose need is to source similar component colours preferably simultaneously, and will thus generally be required to acquire an identical set of lasers to those at the mastering laboratory.

A further advantage of the use of specific unusual colours in the creation of security holograms is that machine readable holographic devices may well be illuminated by LED's or other filtered light sources supplying narrow, bandwidth or monochromatic illumination, which may be selected to recognise the precise colours of the original authentic hologram. Such an illumination system providing two, three or more wavelengths provides a particularly rigorous test of authenticity.

Once the final mass produced hologram is processed so as to create the required colour qualities, the photosensitive layer is typically sealed with permanent adhesive onto the surface of a document or product such that the photosensitive layer is sealed between its PET carrier layer and the surface protected item. Thus, the layer is not susceptible to interference by the counterfeiter and its wavelength cannot be returned to a state, or thickness, where its colours can be easily copied.

Higher optical efficiency in a recorded holographic image can be achieved by minimising wasted space between recorded holographic areas 64. This could be achieved during the recording process by moving one of the optical elements 41, 42, 141, 142 so as to modulate the position and/or the shape of the return beam 32, 132 with respect to the transmitted beam 20, 120. In this way, non-circular or non-elliptical areas 64 may be recorded, for example square, rectangular or hexagonal areas.

As the hologram film is rotated under suitable illumination, a first graphic image in full colour or a single colour may be seen by the viewer. Moving the hologram by rotating it, or moving the light source, or the viewer's position, may then result in the appearance of subsequent discrete graphic images in full colour or in a single colour. Incremental change of this type may be used to create animation effects or even stereographic effects. The discrete colours associated with each pixel provide considerable advantages above the methods which have been used to create pixelated images for embossed security holograms in the past.

In a further variation, the invention permits the recording of an intensity grey-scale or colour tonal scale between different recorded pixels 64. Specifically, the individual grating efficiency could vary from one recorded area 64 to another. This can be achieved by varying the exposure time between pixels 64, in order to create tonal effects into an image, as well as colour, angle and orientation as described above. For example, at typical available laser powers, the exposure time per pixel could range between 1 ms and 50 ms. Each laser colour could be used to create a tonal image by arranging the individual pixels of an image component to display different brightness. This could be quite important for images such as portraits, for example.

The final holographic recordings viewed by a user in reflection may include a transparent or substantially transparent backing or support layer. In this case, the user may view light coming from behind the holographic recording and perceive this as being superimposed with the holographic image. An example of this might be a security hologram laminated onto a bank note with the printing on the bank note being visible behind the hologram. Alternatively, the final holographic recording may be mounted or supported in front of an absorbing layer, for example a matt black layer, so that the contrast of the reflected holographic image is maximised. An example of this might be a holographic photographic likeness of an individual laminated into a credit card.

The invention therefore provides an efficient and convenient method and apparatus for producing a hologram, in particular a dot matrix volume hologram, with enhanced security and the ability to display a range of visible colours, and optionally invisible wavelengths as a security device.

The invention claimed is:

1. A method of forming a volume reflection hologram in a holographic recording medium, the medium being transparent or partially transparent and having a first side and opposite to the first side a second side, the method comprising the steps of:
   i) providing a coherent source of optical radiation;
   ii) directing the optical radiation towards the recording medium so that said optical radiation is incident on said first side, at least some of said incident radiation being transmitted through the recording medium to exit as exit radiation from said second side along an optical axis;
   iii) redirecting at least some of said exit radiation as redirected incident radiation back towards said recording medium so that said redirected incident radiation is incident on said second side, at least some of said redirected incident radiation being transmitted through the recording medium towards said first side, said incident radiation and said redirected incident radiation thereby intersecting at an obtuse angle to create at least one interference pattern within the optical recording medium;
   iv) creating from one or more of said interference patterns a volume hologram in the recording medium;
wherein step iii) comprises the steps of:
   v) first directing the exit optical radiation away from the optical axis; and then
   vi) directing the exit optical radiation back towards the optical axis and said second side so that said redirected optical radiation is incident on the second side at an obtuse angle to the optical axis.

2. A method as claimed in claim 1, in which step v) includes reflecting said exit radiation with a mirror surface non-perpendicular to the optical axis.

3. A method as claimed in claim 2, comprising the step of focusing said exit radiation towards said mirror surface.

4. A method as claimed in claim 1 in which the interference pattern comprises spaced-apart interference fringes, the method comprising the step of varying at least one of (1) the angle of incidence of the incident optical radiation on the first side and (2) the angle of incidence of the redirected optical radiation on the second side, in order to vary the obtuse angle and hence the angle of the interference fringes.

5. A method as claimed in claim 4, comprising the steps of creating a plurality of interference patterns differing in at least one of interference fringe angles and orientations in corresponding different volumes of the recording medium in order to produce an eye-visible or machine-visible holographic image.

6. A method as claimed in claim 1 in which the interference pattern comprises spaced-apart interference fringes, the method comprising the step of varying the direction of incidence of the redirected optical radiation on the second side in order to vary the orientation of the interference fringes.

7. An apparatus for recording a volume reflection hologram in a transparent or partially transparent holographic recording medium, of the type having a coherent source of optical radiation, a mount for holding the recording medium, and an optical system, wherein the improvement comprises:
   the mount configured to define a recording plane positioned between the source of optical radiation and the optical system; with the mount arranged to hold the recording medium in the recording plane so that in use a first side of the recording medium is presented towards the source of optical radiation, and a second side of the recording medium opposite to the first side is presented towards the optical system; with the source arranged to project the optical radiation towards the recording plane and towards the optical system along an optical axis; and with the optical system arranged to redirect said optical radiation away from the optical axis and then back towards the recording plane, said optical radiation projected from the source and said redirected optical radiation thereby intersecting at an obtuse angle in the recording plane, so that in use at least one interference pattern is created within an optical recording medium positioned in the recording plane.

8. A holographic recording system, comprising:
   a coherent source of optical radiation,
   a mount configured to hold a transparent or partially transparent holographic recording medium having a first side, a second side and a recording volume, the second side being opposite to said first side and the recording volume being between the sides, and
   an optical system,
   wherein the mount positions the recording medium between the source of optical radiation and the optical system so that said first side is presented towards the source of optical radiation and said second side is presented towards the optical system;
   wherein the source is arranged to project incident optical radiation onto said first side and through the recording volume and towards the optical system along an optical axis;
   wherein the optical system is arranged to redirect said optical radiation back onto said second side and into the recording volume so that said incident and redirected optical radiation intersect within the recording volume at an obtuse angle to create an interference pattern from which a holographic recording may be made; and
   wherein the optical system is arranged to first direct the optical radiation away from the optical axis and then to direct said optical radiation back towards the optical axis so as to intersect with the incident optical radiation within said recording volume at an obtuse angle.

9. A holographic recording system as claimed in claim 8, in which the optical system includes a mirror surface set non-perpendicular to the optical axis to reflect the exit radiation away from the optical axis.

10. A holographic recording system as claimed in claim 9, in which the optical system is configured to produce the interference pattern including spaced-apart interference fringes, the holographic recording system comprising an angular adjustment for varying at least one of (1) the angle of incidence of the incident optical radiation on the first side and (2) the angle of incidence of the redirected optical radiation on the second side, in order to vary the obtuse angle and hence the spacing of the interference fringes.

11. A holographic recording system of claim 10, wherein the optical system has one or more rotatable optical elements for varying the direction of incidence of the redirected optical radiation on the second side in order to vary the orientation of interference fringes.

12. A holographic recording system as claimed in claim 11, in which the optical system is rotatable about an optical axis defined by the direction of the exit optical radiation towards the optical system.

13. A holographic recording system as claimed in claim 11, comprising a control configured to control the relative orientations of the polarizations of the incident optical radiation and the redirected optical radiation within said recording volume.

14. A holographic recording system as claimed in claim 10 wherein the mount is configured to reposition the recording medium relative to the optical source and the optical system so that a plurality of interference patterns differing in at least one of interference fringe spacings and orientations may be formed in corresponding different volumes of the recording medium in order to produce an eye-visible holographic image.

15. A holographic recording system as claimed in claim 8, further including a lens or lens system for focusing said exit radiation towards said mirror surface.

16. A holographic recording system as claimed in claim 8, further including a concave mirror for focusing said exit radiation towards said mirror surface.

* * * * *